United States Patent [19]

Sadowski et al.

[11] Patent Number: 5,608,461
[45] Date of Patent: Mar. 4, 1997

[54] PROGRAMMABLE VIDEO FRAME DETECTOR

[75] Inventors: Greg Sadowski, Santa Clara; David L. Dignam, Belmont, both of Calif.

[73] Assignee: Silicon Graphics, Inc., Mountain View, Calif.

[21] Appl. No.: 413,393

[22] Filed: Mar. 29, 1995

[51] Int. Cl.⁶ .................................................. H04N 5/08
[52] U.S. Cl. ............................................................... 348/526
[58] Field of Search ........................... 348/500, 510, 348/513, 521, 524, 558, 469, 529, 441, 552, 555, 525, 526, 527; 375/354, 360, 376, 364; 370/102, 105.5; H04N 9/475, 5/08

[56] References Cited

U.S. PATENT DOCUMENTS

| | | | |
|---|---|---|---|
| 4,683,495 | 7/1987 | Brock | 348/526 |
| 5,025,496 | 6/1991 | Canfield | 348/526 |
| 5,175,620 | 12/1992 | Kim | 348/526 |
| 5,247,359 | 9/1993 | Okada et al. | 348/526 |
| 5,327,175 | 7/1994 | Kim | 348/526 |
| 5,473,387 | 12/1995 | Okada et al. | 348/526 |

*Primary Examiner*—Michael H. Lee
*Attorney, Agent, or Firm*—Wagner, Murabito & Hao

[57] ABSTRACT

A synchronizing device is described. The synchronizing device detects a video frame. The synchronizing device determines a duration of a first signal state of a video signal, determines a duration of a second signal state of the video signal and compares the duration of a first signal state with the duration of a second signal state.

12 Claims, 6 Drawing Sheets

PROGRAMMABLE VIDEO FRAME DETECTOR

FIELD OF THE INVENTION

The invention pertains to video signal processing. More specifically the invention pertains to video frame detection and video format differentiation.

BACKGROUND OF THE INVENTION

Multiple video devices are sometimes used together to produce a video image. One of the video devices can be a graphics computer. But, in linking the video devices, the video devices have to be synchronized to each other. The signal from one has to line up with the signal from the other. A synchronizing device which can reside in one of the video devices is used for the synchronization. The synchronizing device analyzes the reference sync signal from the other video devices. To synchronize vertically, the synchronizing device has to ascertain the beginning of the frame from the video reference signal of the video signal using a frame detector. This video reference signal is also called the composite sync signal and is a train of pulses of different width, as well as different time intervals between pulses. The beginning of frame information is used to synchronize the video signals.

One prior synchronizing device detects the start of a frame by looking for serration pulses after the equalization pulse. However, this prior device is "hard wired" and only accepts a limited number of video formats. When new video formats are developed, the prior synchronizing device is unable to handle the new format. With each new video format, new circuitry and a new synchronizing device has to be developed.

Thus, what is needed is a programmable synchronizing device which can accept a variety of different video formats and which can be programmed to accept a new video format.

SUMMARY OF THE INVENTION

A novel apparatus for detecting a video frame is described. The apparatus comprises an input for receiving a video signal, a duration detector coupled to the input for measuring a duration of a most recent level portion of the video signal, a register coupled to the duration detector for storing a duration of a previous level portion of the video signal, and a comparison device coupled to the duration detector and the register for comparing the most recent level portion of the video signal with the previous level portion of the video signal.

Under an alternative embodiment, the apparatus further comprises a video reference detector coupled to the comparison device for detecting a beginning of a video reference component of the video signal.

Under another alternative embodiment, the comparison device generates a first signal when the duration of the most recent level portion is shorter than the duration of the previous level portion, generates a second signal when the duration of the most recent level portion is longer than the duration of the previous level portion and generates a third signal when the duration of the most recent level portion is equal to the duration of the previous level portion.

Under yet another alternative embodiment, the apparatus further comprises a sequence tracer device coupled to the comparison device operable to compare a sequence with a stored sequence and is operable to provide an indication when the sequence matches the stored sequence.

A method for detecting a video frame from a video signal is also described. The method comprises determining a duration of a first signal state of the video signal, determining a duration of a second signal state of the video signal, and comparing the duration of a first signal state with the duration of a second signal state.

Under an alternative embodiment, the method further comprises determining a beginning of a video reference component of the video signal.

Under another alternative embodiment, determining a beginning of a video reference component of the video signal comprises determining a number of consecutive equal durations of signal states, comparing the number to a specified number of equal durations, and providing an indication when an unequal duration occurs after the specified number of equal durations.

Under yet another alternative embodiment, the method further comprises generating a sequence of relative durations wherein each relative duration indicates a duration of the first signal state with respect to the second signal state, comparing the sequence with a stored sequence, and indicating when the sequence matches the stored sequence.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A novel synchronizing device is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
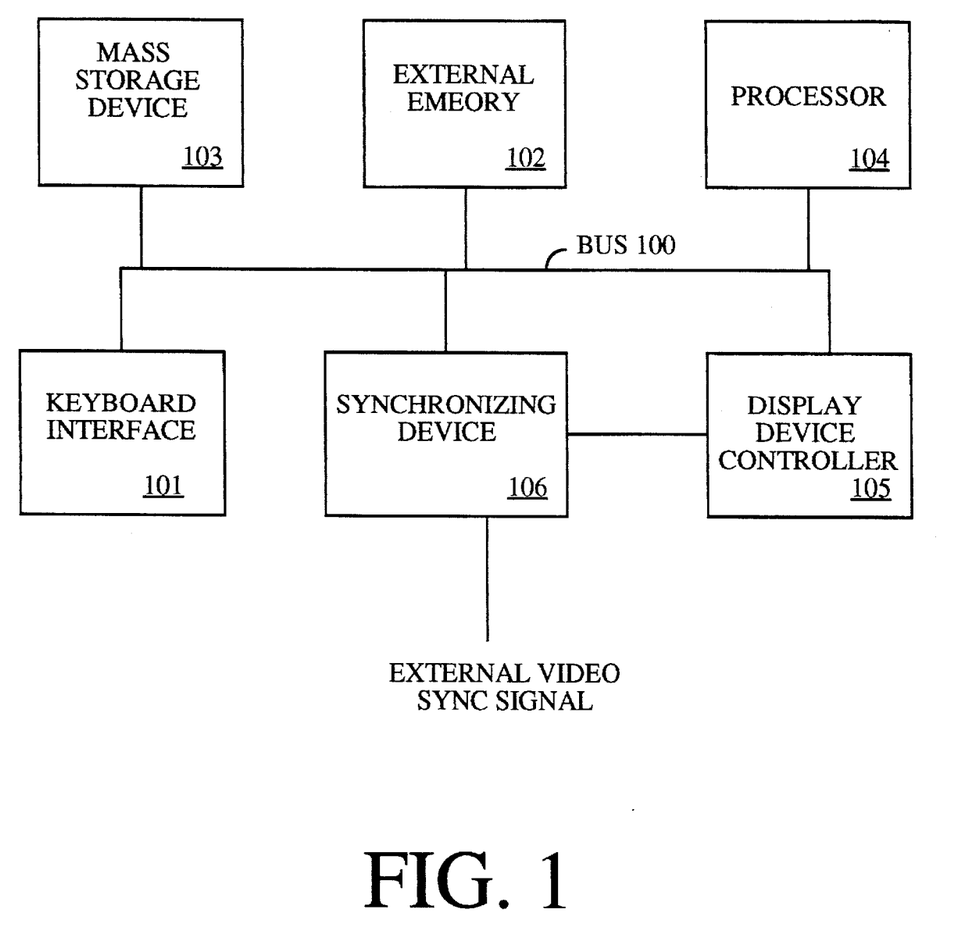
FIG. 1 illustrates in block diagram form a computer system of one embodiment of the present invention.

FIG. 1 illustrates in block diagram form a computer system of one embodiment of the present invention. The computer system comprises bus 100, keyboard interface 101, external memory 102, mass storage device 103, processor 104 and display device controller 105. Bus 100 is coupled to display device controller 105, keyboard interface 101, microprocessor 104, memory 102 and mass storage device 103. Display device controller 105 can be coupled to a display device. Keyboard interface 101 can be coupled to a keyboard.

Bus 100 can be a single bus or a combination of multiple buses. As an example, bus 100 can comprise an Industry Standard Architectural (ISA) bus, an Extended Industry Standard Architecture (EISA) bus, a system bus, a X-bus, PS/2 bus, a Peripheral Components Interconnect (PCI) bus, a Personal Computer Memory Card International Association (PCMCIA) bus or other buses. Bus 100 can also comprise a combination of any buses. Bus 100 provides communication links between components in the computer system. Keyboard interface 101 can be a keyboard controller or other keyboard interface. Keyboard interface 101 can be a dedicated device or can reside in another device such as a bus controller or other controller. Keyboard interface 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information and data from mass storage device 103 and processor 104 for use by processor 104. Mass storage device 103 can be a hard disk drive, a floppy disk drive, a CD-ROM device, a flash memory device or other mass storage device. Mass storage device 103 provides information and data to external memory 102.

Processor 104 processes information and data from external memory 102 and stores information and data into external memory 102. Processor 104 also receives signals from keyboard controller 101 and transmits information and data to display device controller 105 for display on a display device. Processor 104 also transmits video images to display controller for display on a display device. Processor 104 can be a complex instruction set computing (CISC) microprocessor, a reduced instruction set computing (RISC) microprocessor, a very long instruction word (VLIW) microprocessor or other processor device. Display device controller 105 allows coupling of a display device to the computer system and acts as an interface between the display device and the computer system. Display device controller 105 can be a monochrome display adapter (MDA) card, a color graphics adapter (CGA) card, enhanced graphics adapter (EGA) card or other display device controller. The display device can be a television set, a computer monitor, a flat panel display or other display device. The display device receives information and data from processor 104 through display device controller 105 and displays the information and data to the user of the computer system.

The computer system also comprises synchronizing device 106. Synchronizing device 106 can be a separate component coupled to bus 100 or synchronizing device 106 can reside in display device controller 105. Synchronizing device 106 is coupled to an external video device and is operable to detect a video frame or field in the video signal of the external video device. Synchronizing device 106 comprises an input for receiving a video signal, a duration detector coupled to the input for measuring a duration of a current level portion of the video signal, a register for storing a duration of a previous level portion of the video signal, and a comparison device coupled to the duration detector and the register for comparing the current level portion of the video signal with the previous level portion of the video signal.

Figure 2:
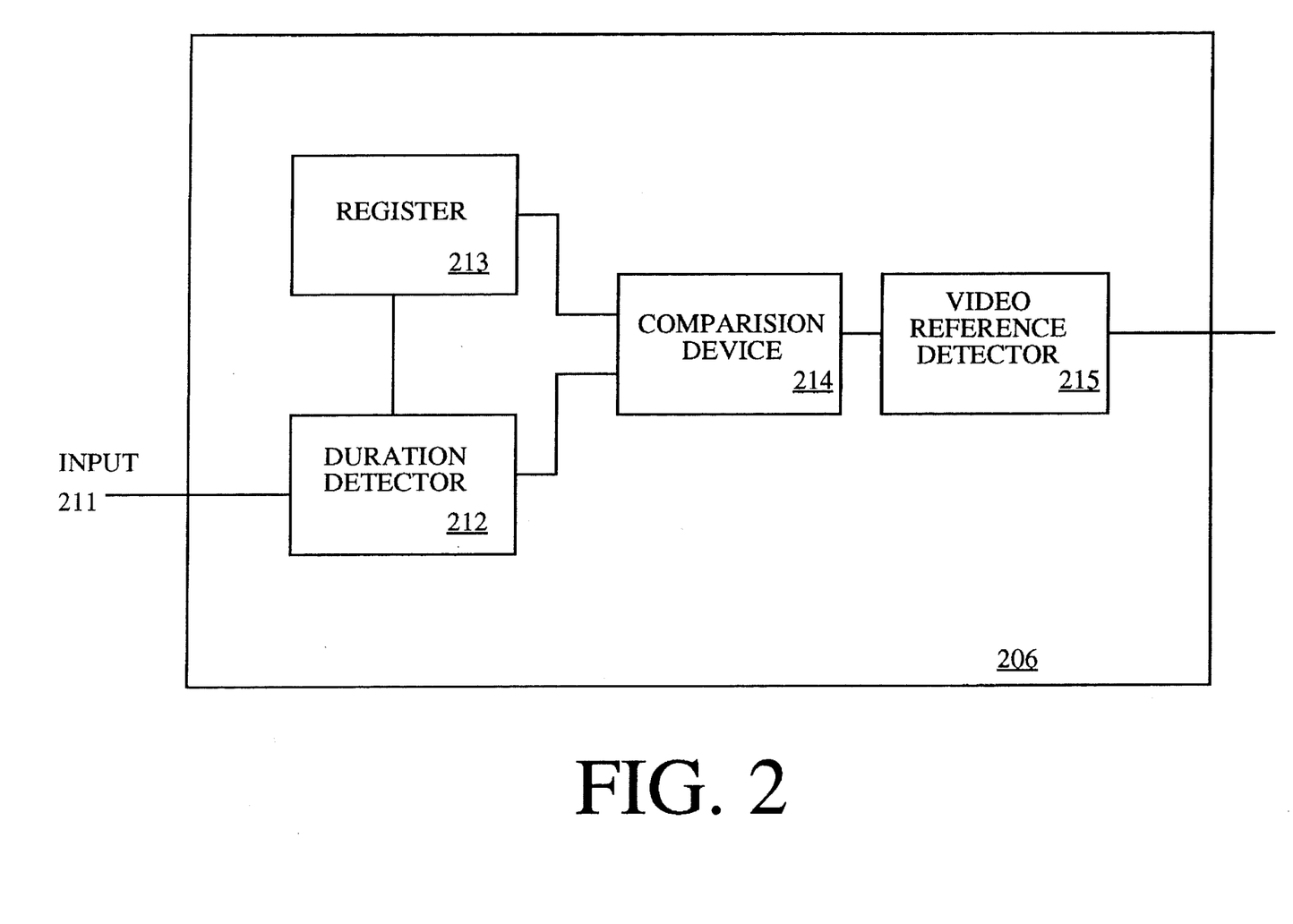
FIG. 2 illustrates in block diagram form a synchronizing device of a second embodiment of the present invention.

FIG. 2 illustrates in block diagram form a synchronizing device of a second embodiment of the present invention. Synchronizing device 206 comprises input 211, duration detector 212, register 213, comparison device 214 and video reference detector 215. Input 211 is coupled to an external video device and receives a video signal from the external video device. Duration detector 212 is coupled to input 211 and receives the video signal from the external video device through input 211. Duration detector 212 measures the duration of level portions of the video signal. Register 213 is coupled to duration detector 212 and stores the duration information from duration detector 212. Thus, after duration detector 212 measures the duration of the level portion received through input 211, duration detector 212 transmits the duration information to register 213 and register 213 stores the measured duration. As level portions of the video signal are received through input 211, duration detector 212 measures the duration of the most recent (or current) level portion in the video signal while register 213 stores the duration of the previous level portion in the video signal. In this embodiment, the level portion being measured by duration detector 212 is the second level portion after the level portion of the duration stored in register 213. Thus, the most recent level portion and the previous level portion are at the same voltage potential. Alternatively, the level portion being measured by duration detector 212 and the level portion of the duration stored in register 213 can be adjacent level portions. In this case, the most recent level portion and the previous level portion are at different voltage potentials (e.g. 5 volts and 0 volts or 3.3 volts and 0 volts).

Comparison device 214 is coupled to duration detector 212 and register 213. Comparison device 214 receives the duration information of the most recent level portion from duration detector 212 and the duration information of a previous level portion from register 213. Comparison device 214 compares the duration information of the most recent level portion with the duration information of the previous level portion. Alternatively, comparison device 214 can be coupled to duration detector 212 through a second register. The second register can store the duration information of the most recent level portion from duration detector 212 and comparison device 214 can compare the duration information from the second register with the duration information from register 213.

After comparing the most recent level portion with the previous level portion, comparison device 214 is operable to generate a first signal when the duration of the most recent level portion is shorter than the duration of the previous level portion. Comparison device 214 generates a second signal when the duration of the most recent level portion is longer than the duration of the previous level portion. Thus, comparison device 214 determines whether the most recent level portion is shorter or longer than the previous level portion. Comparison device 214 can also generate a third signal when the duration of the most recent level portion is equal to the duration of the previous level portion. In this case, comparison device 214 determines whether the most recent level portion is equal to, shorter or longer than the previous level portion. The first, second or third signal can be a single signal state of a given voltage potential (e.g. 5 volts, 3.3 volts or 0 volts) or can be a combination of multiple single signal states at a given voltage potential (e.g. 0 volts on one signal line and 0 volts on a second signal line or 5 volts on one signal line and 0 volts on a second signal line). As an example, the first signal can be a logical-zero and a logical-one (01), the second signal can be a logical-one and a logical-zero (10), and the third signal can be a logical-zero and logical-zero (00). It will be appreciated that in determining whether the most recent level portion is equal to, shorter or longer than the previous level portion, comparison device 214 determines the duration of the most recent level portion with respect to the previous level portion. The duration information presented in this form only requires two bits instead of the far greater number of bits required to present the duration information in absolute form. Thus, by reducing the number of bits required in the duration information, comparison device 214 allows for decreased memory requirements in storing the duration information and also allows for simplified logic in processing the duration information.

Under an alternative embodiment, comparison device 214 is coupled to a programmable register for storing precision information. In this embodiment, comparison device 214 compares durations to the precision stored in the register.

Video reference detector 215 is coupled to comparison device 214 and receives the signals generated by comparison device 214 (first and second signal or first, second and third signal). Video reference detector 215 is operable to detect the beginning of the video reference component of the video signal. The video signal comprises two components, the active video component and the video reference component. The active video component and the video reference component alternate in the video signal. One follows the other. Video reference detector 215 can detect the beginning of the video reference component by determining the end of the active video component. The end of the active video component can in turn be determined by detecting the active video component and detecting the end of the active video component. The end of the active video component is followed by the beginning of the video reference component which indicates a next video frame or field. In this manner, a video frame or field is detected.

Under an alternative embodiment, video reference detector 215 can be replaced by an active video detector. The active video detector is operable to detect the presence of the active video component of the video signal. The active video detector also detects the end of the active video component once the presence of the active video component is detected. Since the active video component and the video reference component alternate in the video signal, the video reference component follows the end of the active video component. Thus, the end of the active video component indicates a next video frame or field. In this manner, a video frame or field is detected.

Figure 3:
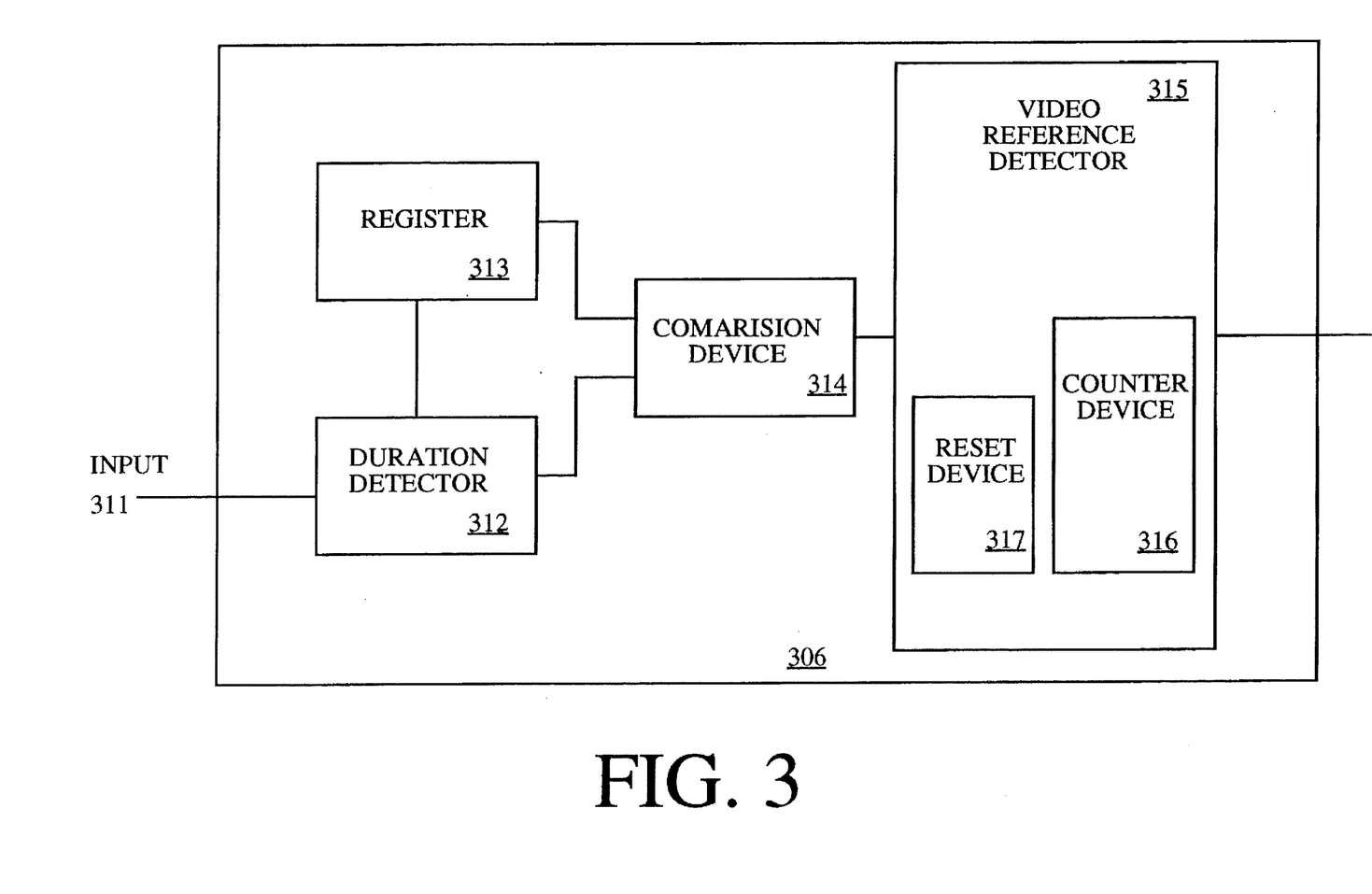
FIG. 3 illustrates in block diagram form a synchronizing device of a third embodiment of the present invention.

FIG. 3 illustrates in block diagram form a synchronizing device of a third embodiment of the present invention. Synchronizing device 306 comprises input 311, duration detector 312, register 313, comparison device 314 and active video detector 315. Active video detector 315 in turn comprises counter device 316 and reset device 317. Input 311, duration detector 312, register 313 and comparison device 314 operates similarly to input 211, duration detector 212, register 213 and comparison device 214 of FIG. 2.

Active video detector 315 is coupled to comparison device 314 and receives the signals generated by comparison device 314 (first and second signal or first, second and third signal). Active video detector 315 is operable to detect the beginning of the active video component of the video signal. The video signal comprises two components, the active video component and the video reference component. The active video component and the video reference component alternate in the video signal. One follows the other. Active video detector 315 can also detect the beginning of the video reference component by determining the end of the active video component. The end of the active video component can in turn be determined by detecting the active video component and detecting the end of the active video component. The active video component has the characteristic of pulses with equal duration and pulse spacing with a duration equal to the pulse duration. Thus, the active video component is detected by counting the number of times where the most recent duration equals the previous duration. Counter device 316 is coupled to comparison device 314 and performs the counting of equal durations. When the number of equal durations equals or exceeds a specified number, the specified number of equal durations indicate the presence of the active video component in the video signal. The specified number utilized by active video detector 315 can be stored in a register and can be programmable by altering the value in the register. After reaching the specified number of equal durations, counter device 316 either outputs a signal indicating that the specified number of equal durations has occurred or stores a value indicating that the specified number of equal durations has occurred. Reset device 317 then resets counter device 316. Active video detector 315 and counter device 316 continues to receive signals from comparison device 314. The end of the active video component has the characteristic of a most recent duration not equal to the previous duration (either longer or shorter). Thus, the end of the active video component is detected by a most recent duration longer or shorter than a previous duration. Counter device 316 indicates the end of the active video component and the beginning of the video reference component by an output signal. In this manner, a video frame or field is detected.

Figure 4:
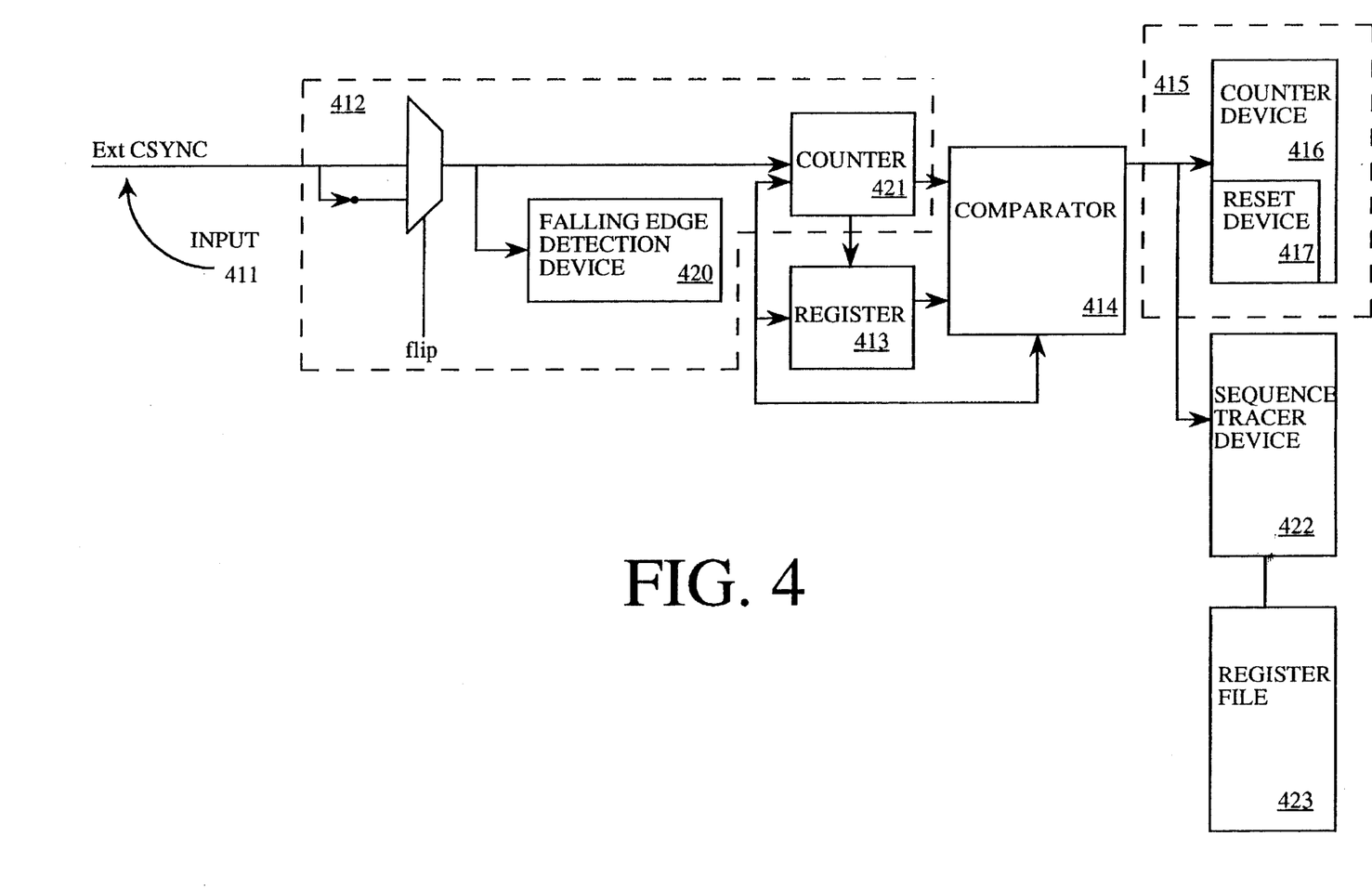
FIG. 4 illustrates in block diagram form a synchronizing device of a fourth embodiment of the present invention.

FIG. 4 illustrates in block diagram form a synchronizing device of a fourth embodiment of the present invention. Synchronizing device 406 comprises input 411, duration detector 412, register 413, comparison device 414, active video detector 415, sequence tracer device 422 and register file 423. Input 411 comprises an external composite sync line. Duration detector 412 comprises multiplexor 419, falling edge detection device 420 and counter 421. Active video detector 415 comprises counter device 416 and reset 417. Reset 417 resides in counter device 416.

Input 411 is coupled to an external video device and receives a video sync signal from the external video device. The video syncsignal can be an external composite sync signal.

Multiplexor 419 receives the video sync signal from input 411 directly into the first input terminal. Multiplexor 419 also receives the video sync signal from input 411 into the second input terminal after the video signal passes through an inverter. When a first flip signal is transmitted to the select terminal of multiplexor 419, multiplexor 419 selects the first input terminal and transmits the video sync signal from multiplexor 418 to falling edge detection device 420 and counter 421. When a second flip signal is transmitted to the select terminal of multiplexor 419, multiplexor 419 selects the second input terminal and transmits the inverted video sync signal from multiplexor 418 to falling edge detection device 420 and counter 421. The first or second flip signal can be provided by a programmable flip register. In this embodiment, a first flip signal is transmitted to multiplexor 419 when positive pulses are measured in the video sync signal and a second flip signal is transmitted to multiplexor 419 when negative pulses are measured in the video sync signal. Because the second flip signal causes multiplexor 419 to select the inverted video sync signal, multiplexor 419 actually transmits a positive pulse to falling edge detection device 420 and counter 421 when a negative pulse appears in the video signal. Multiplexor 419 also transmits a positive pulse to falling edge detection device 420 and counter 421 when a positive pulse appears in the video signal. In this manner, multiplexor 419 can transmit a positive pulse in response to a positive pulse when measuring durations of positive pulses and in response to a negative pulse when measuring durations of negative pulses. The positive pulse allows the same circuitry to be used in determining the duration of the level option of positive pulses and the duration of the level portion of negative pulses.

Falling edge detection device 420 and counter 421 receive the positive pulse from multiplexor 419. When multiplexor 419 transmits the rising edge of the positive pulse, counter 421 receives the rising edge of the positive pulse and begins counting elapsed time. When multiplexor 419 transmits the falling edge of the positive pulse, falling edge detection device 420 receives the falling edge and transmits a signal to counter 421 indicating the presence of the falling edge. In response to the signal from falling edge detection device 420, counter 421 ceases the counting of elapsed time and retains the elapsed time. Because the rising edge and the falling edge define the beginning and the end of a level portion, counter 421 can determine the duration of a level portion by initiating counting at the rising edge and ceasing counting at the falling edge. In this manner, duration detector 412 can determine the duration of a level portion.

Counter 421 retains the elapsed time indicating duration of the level portion until the falling edge of the next positive pulse. At the falling edge of the next positive pulse, counter 421 stores the elapsed time in register 413 and retains the elapsed time of the next positive pulse. It will be appreciated that during a stream of pulses, counter 421 retains the elapsed time of the most recent pulse and register 413 stores the elapsed time of the previous pulse.

Register 413 and counter 421 then transmit the elapsed time of the most recent pulse and the elapsed time of the previous pulse to comparator 414. Comparator 414 functions similarly to comparison device 214 of FIG. 2 and comparison device 314 of FIG. 3. Comparison device 414 generates a first signal when the duration of the most recent level portion is shorter than the duration of the previous level portion and generates a second signal when the duration of the most recent level portion is longer than the duration of the previous level portion. Alternatively, comparison device 414 generates a first signal when the duration of the most recent level portion is shorter than the duration of the previous level portion, generates a second signal when the duration of the most recent level portion is longer than the duration of the previous level portion and generates a third signal when the duration of the most recent level portion is equal to the duration of the previous level portion.

The first and second signal or the first, second and third signal is transmitted from comparator 414 to active video detector 415 and sequence tracer device 422. Active video detector 415, counter device 416 and reset device 417 function similarly to active video detector 315, counter device 316 and reset device 317 of FIG. 3. Counter device 416 indicates the end of the active video component and the beginning of the video reference component by an output signal which is transmitted to sequence tracer device 422.

In response to the output signal from counter device 416, sequence tracer device 422 initiates a comparison of the output signals from comparator 414 with the contents of register file 423. Register file 423 comprises a stored sequence of duration entries. Each duration entry indicates the relative duration of a pulse with respect to the pulse preceding it. Thus, the relative duration is indicated by values corresponding to durations longer than and shorter than the previous duration or alternatively, durations longer than, shorter than and equal to the previous duration. The stored sequence corresponds to a predetermined video format (e.g. NTSC, PAL etc.) Register file 423 can also comprise a plurality of stored sequences, each sequence corresponding to a separate format. With such multiple stored sequences, synchronizing device 406 can accept any one of the formats corresponding to a stored sequence.

When initiated by an output signal from counter device 416, sequence tracer device 422 can compare each individual output signal from comparator 414 with an entry of a stored sequence or multiple entries of multiple stored sequence. As each output signal is received from comparator 414, sequence tracer device 422 compares the output signal with the subsequent entry in the sequence or sequences. In this manner, each duration occurring after the beginning of the video reference component is compared with an entry of a stored sequence or sequences in register file 423. When sequence tracer device 422 detects a match between a sequence of durations and a stored sequence in register file 423, sequence tracer device 422 transmits an output signal indicating frame start.

Alternatively, when initiated by an output signal from counter device 416, sequence tracer device 422 can generate a sequence of individual output signals from comparator 414. After a predetermined number of output signals, sequence tracer device 422 compares the generated sequence with a stored sequence in register file 423 or multiple stored sequences in register file 423. When sequence tracer device 422 detects a match between a sequence of durations and a stored sequence in register file 423, sequence tracer device 422 transmits an output signal indicating frame start.

One example of possible sequence entries is 00 to indicate the same duration as the previous duration, 01 to indicate a shorter duration than the previous duration, 10 to indicate a longer duration than the previous duration and 11 to indicate the end of the sequence. A sequence can comprise any combination of 00, 01 or 10 entries with a 11 entry at the end. Sequence tracer device 422 compares the output signals of comparator 414 with the sequence. When all entries match prior to the 11 entry, sequence tracer device 422 transmits the frame start signal in response to the 11 entry.

Under a fifth embodiment of the present invention, register file 423 comprises a plurality of stored sequences, each sequence corresponding to a separate format. In this embodiment, when sequence tracer device 422 detects a match between a sequence of durations and a stored sequence in register file 423, sequence tracer device 422 transmits an output signal corresponding to the matched stored sequence. Each stored sequence has a unique output signal associated with it. In this manner, sequence tracer device 422 can identify the format of the video sync signal (e.g. NTSC or PAL or other format). The output signal corresponding to the matched stored sequence can be generated in addition to or instead of the frame start signal.

Figure 5:
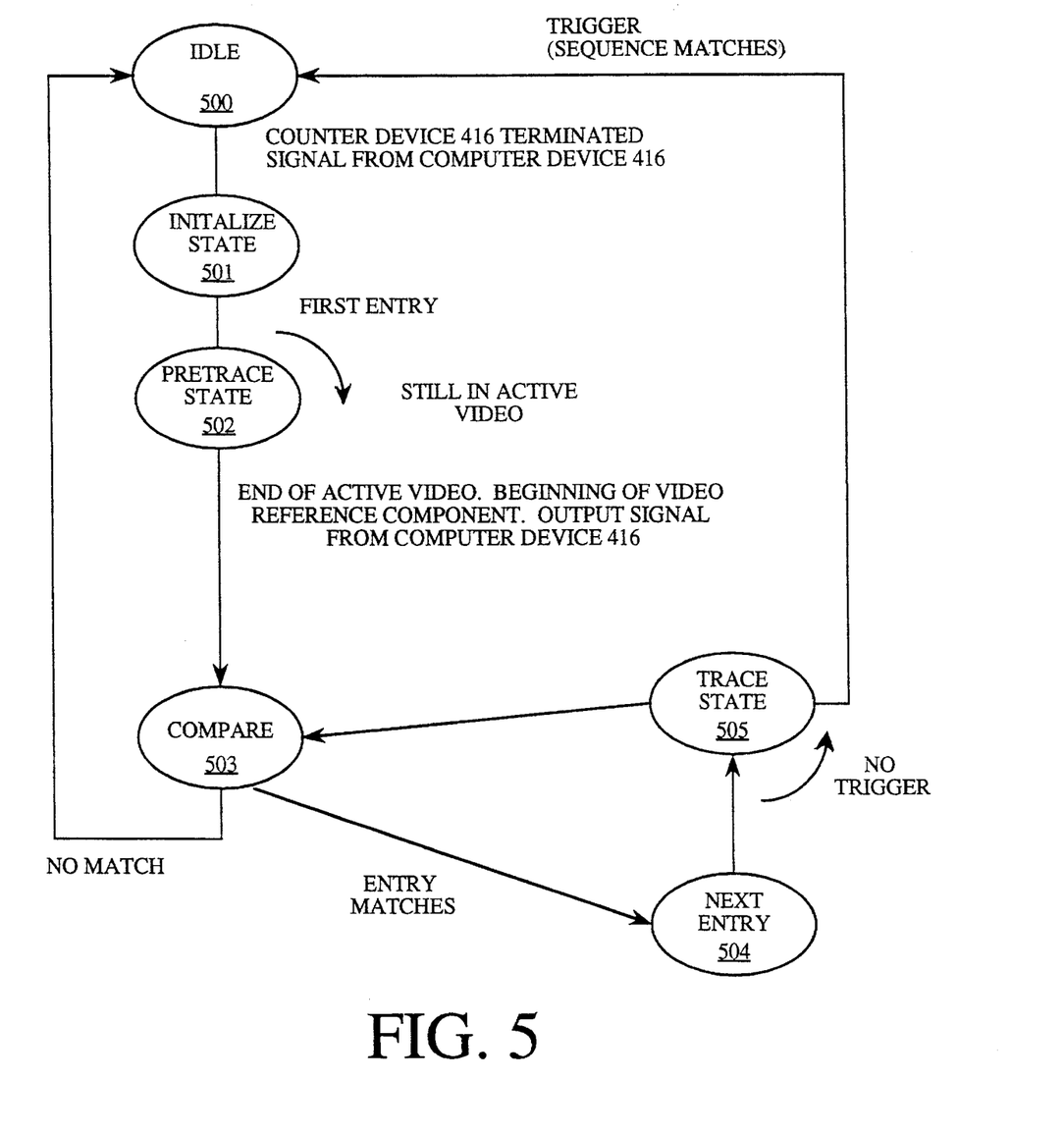
FIG. 5 illustrates in state diagram form the operation of the sequence tracer device of the fourth embodiment of the present invention.

FIG. 5 illustrates in state diagram form the operation of the sequence tracer device of the fourth embodiment of the present invention. When synchronizing device 406 is powered up, sequence tracer device 422 powers up in the IDLE state as shown in state 500. Sequence tracer device 422 remains in the IDLE state until active video detector 415 detects the active video component of the video signal. When the active video component is detected, counter device 416 is terminated. Counter device 416 also transmits an output signal indicating that the specified number of equal durations has occurred. Sequence tracer device 422 then transitions to the initialize state as shown in state 501. In the initialize state, the circuits of sequence tracer device 422 are activated. The first entry or first entries in register file 423 are loaded into sequence tracer device 422. Sequence tracer device 422 then transitions to the pre-trace state as shown in state 502. Sequence tracer device 422 remains in the pre-trace state while synchronizing device 406 receives the active video component. The end of the active video component occurs when a most recent duration is not equal to the previous duration (either longer or shorter). At the end of the active video component, counter device 416 transmits an output signal indicating the end of the active video component and the beginning of the video reference component. In response to the signal from counter device 416, sequence tracer device 422 transitions to the compare state as shown in state 503. In the compare state, sequence tracer device 422 compares the output signal from comparator 414 with the entry or entries previously loaded (in this case, the first entry or first entries). When no match is detected, sequence tracer device 422 transitions back to IDLE state 500.

On the other hand when a match with an entry is detected, sequence tracer device 422 transitions to state 504. In state 504, sequence tracer device 422 loads the next entry or entries. Sequence tracer device 422 then transitions to the trace state as shown in state 505. Sequence tracer device 422 remains in the trace state while duration detector 412 and comparator 414 determine the relative duration of the most recent level portion. When sequence tracer device 422 receives the next output signal from comparator 414, sequence tracer device 422 transitions to compare state 503. On the other hand, when the next entry in any of the storage sequences is a 11 entry, a sequence match is indicated. Sequence tracer device 422 transmits an output signal indicating frame start and transitions back to IDLE state 500.

Figure 6:
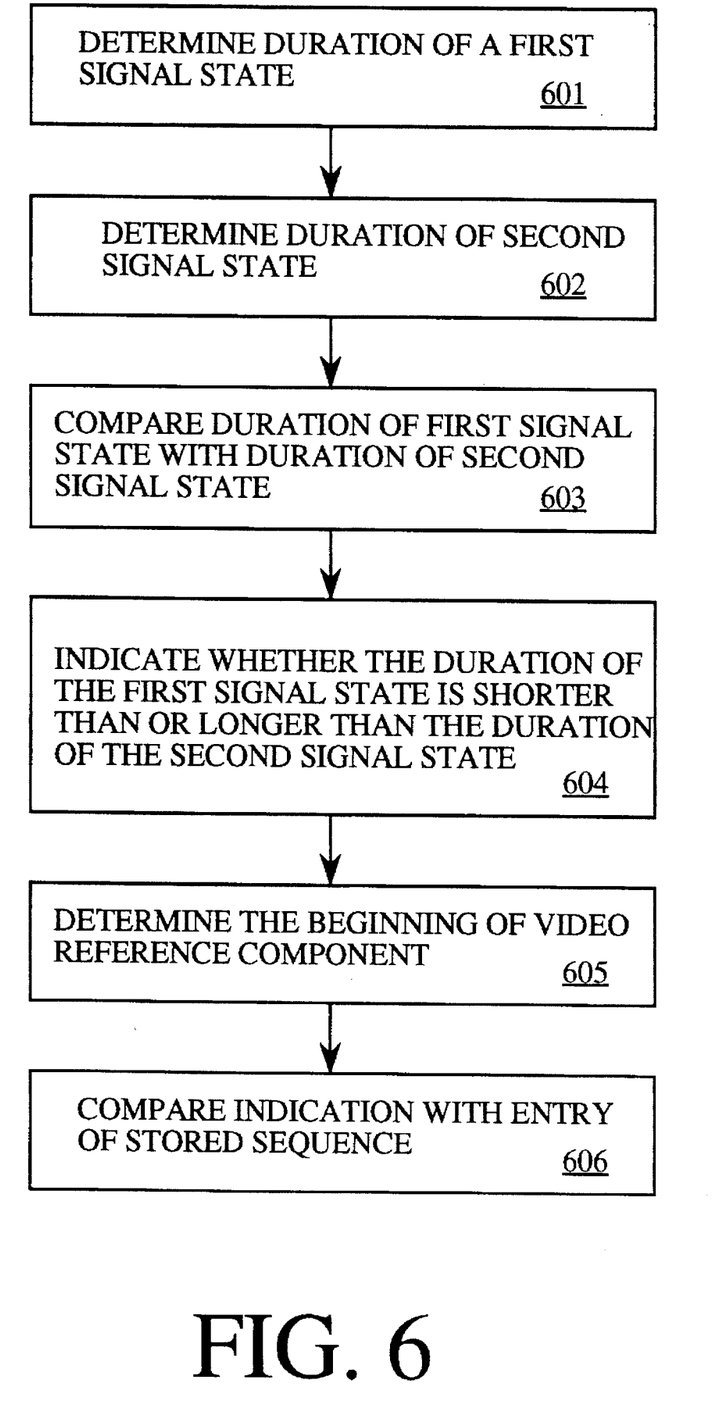
FIG. 6 illustrates in flowchart diagram form the operation of a synchronizing device of a sixth embodiment of the present invention.

FIG. 6 illustrates in flowchart diagram form the operation of a synchronizing device of a sixth embodiment of the present invention. The synchronizing device determines the duration of a first signal state of the video signal as shown in block 601. The synchronizing device then determines the duration of a second signal state of the video signal as shown in block 602. The first signal state and the second signal state can be separated by an intermediate signal state. In this case, the first signal state and the second signal state are at the same voltage potential (e.g. 5 volts, 3.3 volts or 0 volts). Alternatively, the first signal state and the second signal state can be adjacent signal states. In this case, the first signal state and the second signal state are at different voltage potentials. The synchronizing device then compares the duration of the first signal state with the duration of the second signal state as shown in block 603. The synchronizing device then indicates whether the duration of the first signal state is shorter than or longer than the duration of the second signal state as shown in block 604. Alternatively, the synchronizing device can also indicate whether the duration of the first signal state is equal to the duration of the second signal state.

The synchronizing device then determines the beginning of the video reference component as shown in block 605. The beginning of the video reference component can be determined by determining the presence of an active video component of the video signal and determining the end of the active video component of the video signal. Alternatively, the beginning of the video reference component can also be determined by determining a number of consecutive equal duration of signal states, comparing the number to a specified number of equal durations and providing an indication when an unequal duration occurs after the specified number of equal durations. The synchronizing device then compares the indication with an entry of a storage sequence as shown in block 606. Alternatively, the synchronizing device can generate a sequence of relative durations where each relative duration indicates the duration of the first signal state with respect to the second signal state, comparing the sequence with a storage sequence, and indicating when the sequence matches the storage sequence.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for detecting a video frame has been described.

What is claimed is:

1. An apparatus for detecting a video frame comprising:
   an input for receiving a video signal comprised of a plurality of pulses;
   a duration detector coupled to said input for measuring a pulse width corresponding to one of said plurality of pulses of said video signal;
   a register coupled to said duration detector for storing a time interval between two pulses of said video signal; and
   a comparison device coupled to said duration detector and said register for comparing said pulse width with said time interval and generating bits of information indicating whether the pulse width is greater than, less than or equal to the time interval between the two pulses, wherein the bits of information are used to detect the video frame.

2. The apparatus of claim 1 further comprising:

a video reference detector coupled to said comparison device for detecting a beginning of a video reference component of said video signal.

3. The apparatus of claim 2 wherein the video reference detector comprises:

a counter coupled to said comparison device for counting a number of times when said pulse width equals said time interval between the two pulses; and a reset device coupled to said comparison device and said counter for resetting said counter when said pulse width does not equal said time interval between the two pulses.

4. The apparatus of claim 1 further comprising:

an active video detector coupled to said comparison device for detecting a presence of an active video component of said video signal.

5. The apparatus of claim 1 wherein said comparison device generates a first signal when said pulse width is shorter than said time interval, generates a second signal when said pulse width is longer than said time interval and generates a third signal when said pulse width is equal to said time interval.

6. The apparatus of claim 5 further comprising:

a sequence tracer device coupled to said comparison device for receiving said first signal, said second signal and said third signal from said comparison device and for generating a bit stream comprised of said first signal, said second signal or said third signal.

7. The apparatus of claim 6 wherein said sequence tracer device is operable to compare said bit stream with a plurality of stored bit streams corresponding to different video formats and is operable to provide an indication when said bit stream matches one of said stored bit stream.

8. The apparatus of claim 5 further comprising:

a sequence tracer device coupled to said comparison device for receiving said first signal, said second signal or said third signal from said comparison device and for comparing said first signal, said second signal or said third signal with an entry of a stored sequence corresponding to a particular video format.

9. The apparatus of claim 1 wherein said comparison device also compares said pulse width with a second pulse width corresponding to a second pulse of said plurality of pulses.

10. The apparatus of claim 1 wherein said plurality of pulses are at +5 volts potential.

11. An apparatus for detecting a video frame comprising:

an input for receiving a video signal comprised of a plurality of pulses;

a detector coupled to said input for measuring a first pulse width corresponding to a first pulse of said plurality of pulses of said video signal;

a memory coupled to said detector for storing a second pulse width corresponding to a second pulse of said video signal;

a comparator coupled to said detector and said register for comparing said first pulse width with said second pulse width to generate bits of information indicating whether the first pulse width is greater than, less than or equal to the second pulse width, wherein the bits of information are used to detect the video frame.

12. In a computer system, a method for detecting a video frame, comprising the steps of:

receiving a video signal comprised of a plurality of pulses, wherein two of said pulses have different pulse widths;

determining a pulse width of a first pulse of the plurality of pulses;

determining a spacing corresponding to a time interval occurring between two pulses of said plurality of pulses;

comparing the spacing of the first pulse to the pulse width between the two pulses;

generating a first signal if said spacing is greater than said pulse width, a second signal if said spacing is equal to said pulse width, and a third signal if said spacing is less than said pulse width;

storing a sequence of bits in memory corresponding to a plurality of different video formats;

comparing said first signal, said second signal, or said third signal with said sequence of bits to detect said video frame.

\* \* \* \* \*